Dec. 28, 1948.                L. F. THIEL                2,457,612
                         MIXING MACHINE GEARING
Filed Oct. 3, 1944                                  2 Sheets-Sheet 1

INVENTOR
LOUIS F. THIEL
BY George S. Hastings
ATTORNEY

Dec. 28, 1948. L. F. THIEL 2,457,612
MIXING MACHINE GEARING
Filed Oct. 3, 1944 2 Sheets-Sheet 2
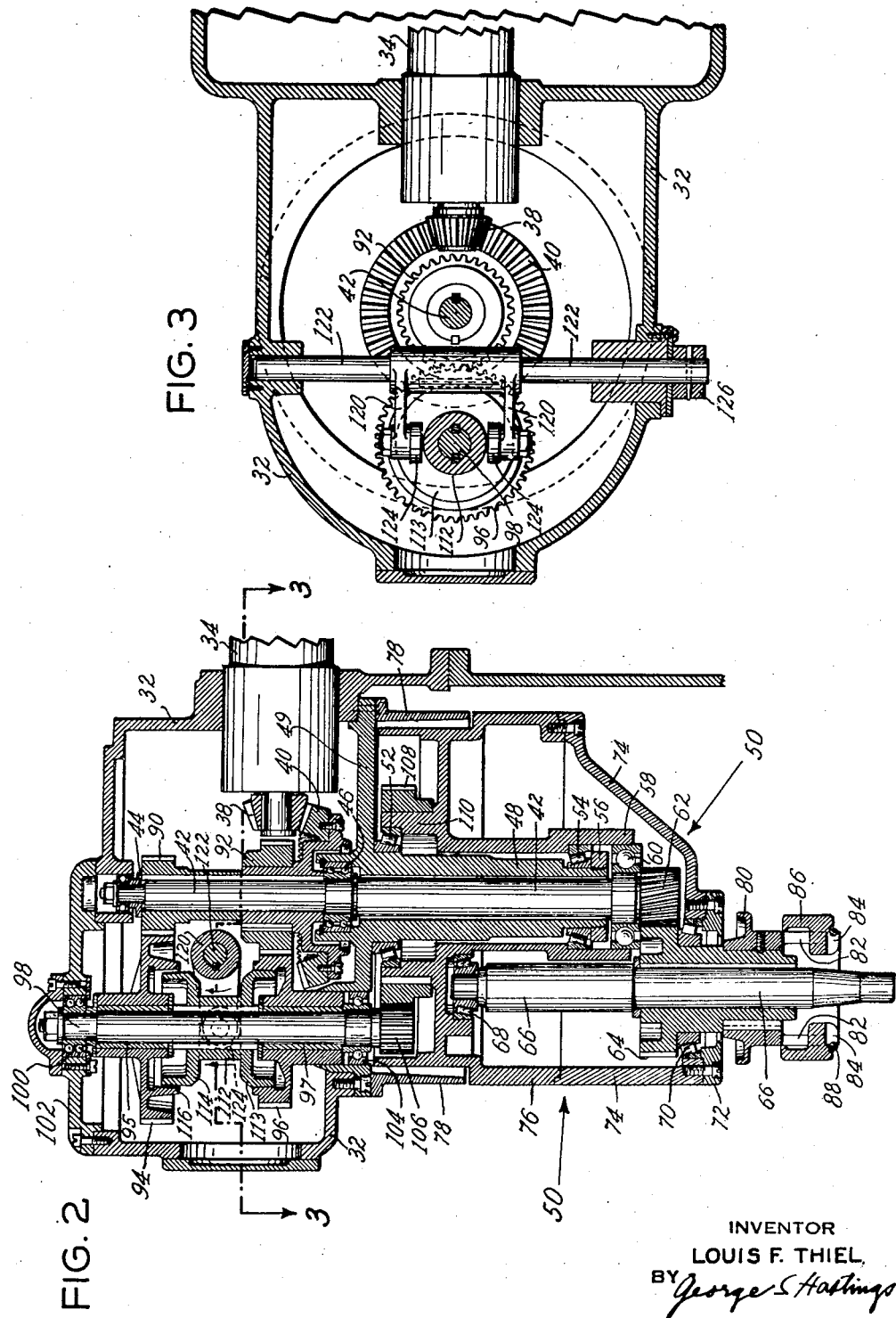
INVENTOR
LOUIS F. THIEL,
BY George S Hastings
ATTORNEY Patented Dec. 28, 1948

2,457,612

UNITED STATES PATENT OFFICE 2,457,612

MIXING MACHINE GEARING

Louis F. Thiel, Springfield Gardens, N. Y., assignor to American Machine & Foundry Company, a corporation of New Jersey Application October 3, 1944, Serial No. 556,937

7 Claims. (Cl. 74—300)

This invention relates to vertical mixers, more particularly to vertical mixers of the type wherein a beater shaft on which the mixing beater is supported is revolved on its own axis and simultaneously moved in an orbital path. Heretofore vertical mixers have been built with a single precession ratio, that is the ratio of the number of revolutions the beater makes on its axis while completing one circuit of its orbital path cannot be varied. However for mixing "foam batches" such as egg whites, a precession ratio of 2:1 has been found to be preferable, whereas for mixing cake dough a precession ratio of 4:1 or slightly greater is desirable. Since most prior vertical mixers have a single precession ratio lying within the range between approximately 3:1 and approximately 4:1, it has not been possible with prior vertical mixers to employ the most efficient precession ratios for mixing "foam batches" and dough.

One of the main objects of the invention is to provide a vertical mixer with a construction capable of varying the precession ratio of the rotation of the beater shaft relative to the revolving beater head which carries the beater shaft in an orbital path. In this respect the invention resembles the constructions shown in the prior application of T. Jensen, Serial No. 523,031, filed February 19, 1944, on which Patent No. 2,404,380 issued July 23, 1936, wherein there is disclosed a vertical mixer whose precession ratio of the rotation of the beater shaft and the beater head may be varied. However my construction is less complicated and more durable than the constructions shown in said patent. It may be noted that with my construction there is only a small variation in the beater speed when changing from one precession ratio to another.

It is a further object of the invention to vary the speed of the beater shaft to suit the particular materials which are being mixed. For example the beater speed cannot be very much higher than 300 r. p. m., when mixing egg whites, in order to avoid splashing of the materials. Moreover, to incorporate the flour added after the egg whites and sugar of a sponge cake batch have been mixed at a speed of approximately 240 r. p. m., the speed of the beater shaft is lowered to about 180 r. p. m. To this end in the particular embodiment of the invention shown herein a variable speed drive is employed to drive the beater head and the beater. Therefore the speed of the beater shaft may be regulated without varying the precession ratio and the precession ratio and beater speed may be varied simultaneously to suit the particular ingredients being mixed. With the Reeves drive employed in my construction, the particular speed of the beater shaft desired may be obtained for most efficient mixing.

With these and other objects not specifically mentioned in view, the invention consists in certain constructions and combinations hereinafter fully described and claimed.

In the accompanying drawings, which form a part of this specification and in which like characters of reference indicate the same or like parts:

Fig. 2 is a vertical sectional view of the mixing head and beater head of the mixer shown in Fig. 1; and Fig. 3 is a cross-section taken on the line 3—3 of Fig. 2.

Figure 1:
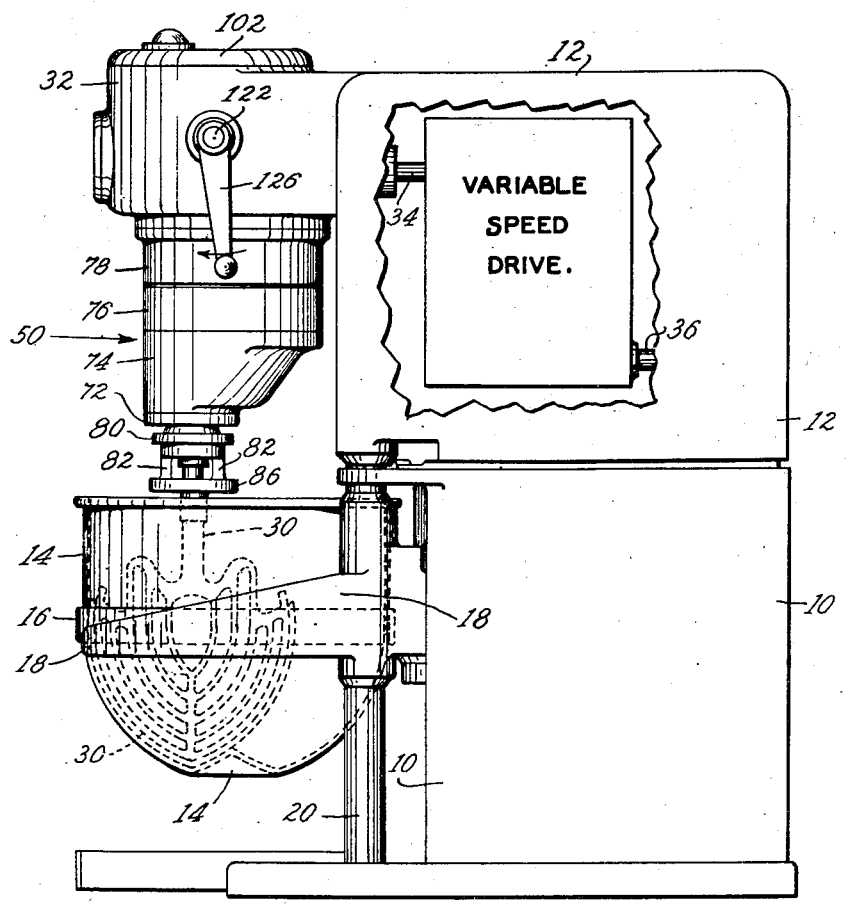
Fig. 1 is a side elevation of a vertical mixer exemplifying the invention, a portion of the head enclosing the variable speed drive being broken away to expose the same.

Referring to Fig. 1 of the drawings, the mixer is provided with a base 10 supporting a movable head 12 having downwardly extending columns (not shown) slidably mounted in base 10 to permit the head to be raised with respect to the base. In Fig. 1 the head 12 is shown in its lower or mixing position wherein it rests on the top of base 10; and the mixing bowl 14, which is provided with a circumferential band 16 resting on a saddle 18 is shown supported in mixing position. The saddle is slidably mounted on upright columns 20 of base 10 and is raised and lowered by mechanism (not shown) of the type disclosed in the patent to W. F. Dehuff 2,181,079, issued November 21, 1939. When the saddle 18 is elevated to the position shown in Fig. 1, its contents are mixed by a beater 30 supported by mechanism, which will be presently described, from a mixing head or gear housing 32 integral with the head 12. After the mixing operation is completed the head 12 is elevated by mechanism (not shown) similar to that of the Dehuff Patent 2,181,079, and the saddle is lowered to permit removal of the mixing bowl. Description of the construction of the mechanism for elevating the head 12 and saddle 16 is deemed unnecessary, since reference may be had to said Dehuff patent for the details thereof.

One end of a horizontal shaft 34 is supported in a suitable bearing in the mixing head 32, and shaft 34 projects from the mixing head and constitutes the driven shaft of the Reeves drive which is enclosed in the head 12 and indicated in Fig. 1 by the legend "Variable speed drive." The drive shaft 36 of this variable speed drive is supported in head 12 and driven from a motor (not shown). The construction of the variable speed drive is conventional and may consist of pairs of conical pulleys mounted on the shafts 34 and 36, the pair of pulleys on shaft 36 driving an endless belt which drives the pulleys on shaft 34. The pulleys on either the shaft 34 or 36 may be brought closer together by mechanism (not shown), to vary the speed at which the shaft 34 is driven. Since the construction of the variable speed drive is similar to that shown in the Dehuff Patent 2,181,079 and the above mentioned Patent No. 2,404,380, further description thereof is deemed unnecessary.

On the inner end of the shaft 34 is secured a bevel gear 38 which drives a bevel gear 40 keyed on the vertical center shaft 42. The upper end of shaft 42 is supported in roller bearings 44 provided in head 32, and its central portion is provided with roller bearings 46 carried by a stationary sleeve 48 having a horizontal flange 49 secured to the bottom of head 32.

A beater head 50 is revolubly mounted on roller bearings 52 and 54 provided on sleeve 48. A retaining ring 56 is threaded on the lower end of sleeve 48 and supports the roller bearing 54 against an internal shoulder formed on the lower end of a sleeve portion 58 formed on beater head 50. The lower end of shaft 42 is supported by ball bearings 60 in the lower end of sleeve 58, and on the portion of shaft 42 projecting from bearings 60 is secured a gear 62 driving a gear 64. Gear 64 is keyed on a beater shaft 66 whose upper end is supported in roller bearings 68 in the beater head 50. Gear 64 is supported by roller bearings 70 supported in a cover plate 72 secured to a cover 74 fastened to the lower end of a circumferential flange 76 on beater head 50. To the horizontal flange 49 of sleeve 48 is fastened a ring 78 surrounding the upper end of flange 76.

On the portion of the hub of gear 64 projecting downwardly through an aperture in cover plate 72 is mounted a beater drive clutch. The latter includes a sleeve 80 fastened on the hub of gear 64 and having downwardly extending arms 82 provided with inwardly projecting lugs 84 on which diametrically opposite lugs on the inserted shank of the beater 30 rest. A ring 86, which is movable vertically on arms 82 and retained thereon by a split ring 88 has a series of inwardly projecting lugs which engage the lugs on the inserted beater shank and thereby drive the beater. Since the construction of the beater drive clutch is similar to that shown in the patent to W. F. Dehuff 1,792,363, further description thereof is deemed unnecessary.

On the upper end of center shaft 42 is keyed a pinion or gear 90, and on the hub of bevel gear 40 is keyed a pinion 92. The gears 90 and 92 drive spur gears 94 and 96 respectively, which revolve freely on sleeves 95 and 97 on a jack shaft 98. The upper end of the latter is supported in ball bearings 100 carried by a cover plate 102 fastened to the top of mixer head 32. The lower end of shaft 98 is mounted in ball bearings 104 supported in the flange 49 of the stationary sleeve 48, and on the portion of shaft 98 projecting through bearings 104 is secured a spur gear 106 meshing with a ring gear 108 provided with external gear teeth and secured on a circumferential flange 110 on the top of the beater head 50. Flange 110 is provided with an internal shoulder which supports the roller bearing 52 against the lower face of flange 49.

On the portion of shaft 98 intermediate the gears 94 and 96 is splined a cone clutch member 112 having a circumferential flange 113 at its lower end. Flange 113 is provided with a conical face which may be tapered with an angle slightly greater than a Morse taper, shown engaged in Fig. 2 with a conical face having a similar taper formed on the rim of gear 96. Thus the shaft 98 is driven from gear 96 through clutch member 112 and the beater head 50 is revolved upon the stationary sleeve 48 to carry the beater shaft 66 together with beater 30 supported thereon in an orbital path. Since the shaft 66 is driven through gears 62 and 64 from the shaft 42 it will revolve upon its own axis while being carried in an orbital path by the beater head 50.

When the shaft 98 is driven through clutch 112 from gear 96, the number of revolutions which the beater shaft 66 will make on its own axis while making a complete circuit of its orbital path, that is to say the precession ratio, is determined by the gear ratios of the gear trains 92, 96 and 106, 108 and the gear ratios of the trains 38, 40 and 62, 64. These gear ratios may be proportioned to establish a precession ratio of approximately 2:1, that is two revolutions of the beater shaft 66 on its own axis for every complete revolution of the beater head.

To vary this precession ratio the clutch member 112, which has on its upper end a circumferential flange 114 provided with a tapered face similar to the tapered face of flange 113, may be shifted upwardly on shaft 98 to bring the tapered face of flange 114 into driving engagement with an internal tapered face on a circumferential flange 116 formed on the web of gear 94. For this purpose a yoke member 120 whose hub is secured on a shaft 122 supported in head 32, carries rollers 124 engaging a circumferential recess formed in the portion of clutch member 112 intermediate flanges 113 and 114. On the end of shaft 122 projecting from head 32 is fastened a crank handle 126. When handle 126 is turned upwardly in a clockwise direction, as viewed in Fig. 1, the flange 113 of clutch member 112 is disengaged from gear 96 and the flange 114 thereof is brought into driving engagement with gear 94. Now the shaft 98 will be driven from gear 94 through clutch member 112 to revolve the beater head at a lower speed and thereby obtain a high precession ratio of the rotation of the beater shaft and the beater head. As shown in the drawings, the pitch diameters of the gears 90 and 94 may be sufficiently different from the pitch diameters of gears 92 and 96 to obtain a precession ratio of approximately 4:1. The lower precession ratio established when the shaft 98 is driven from gear 96 through clutch member 112 is suitable for mixing foam batches such as egg whites, etc. The higher precession ratio is desirable for mixing dough. If desired the gears 90 and 94 may be replaced by gears of different pitch diameter to obtain a greater precession ratio than 4:1.

For certain conditions it may be advantageous to reduce or increase the speed at which the beater shaft 66 is driven. Therefore the variable speed drive can be adjusted to drive the shaft 42 at a greater or lower speed. While variation of the speed at which shaft 42 is driven will correspondingly vary the speed of the beater shaft, the precession ratio will remain the same unless the clutch member 112 is shifted.

What is claimed is:

1. In a mixer, the combination with a head revolubly mounted for rotation about a stationary axis, of a vertical center shaft concentric with the axis of rotation of said head, means for driving said center shaft, a vertical shaft revolubly mounted in said head with its axis eccentric to the axis of rotation of said head, means driven from said center shaft for revolving said eccentric shaft on its own axis, a pair of pinions secured on said center shaft, a vertical jack shaft, a gear fastened on said head, a gear fastened on said jack shaft and meshing with and driving the gear on said head to revolve the head, a pair of gears loosely mounted on said jack shaft and meshing with and driven from the pinions on said center shaft, a clutch member splined on said jack shaft intermediate the loosely mounted gears on the jack shaft and normally engaged with one of said loosely mounted gears whereby the jack shaft will be driven and the head will be revolved to carry said eccentric vertical shaft in an orbital path, and a device for engaging said clutch member with the other of said loosely mounted gears on said jack shaft to revolve said head at a different speed and thereby vary the precession ratio of the rotation of the vertical shaft on its own axis relative to the rotation of the head.

2. In a mixer, the combination with a head revolubly mounted for rotation about a stationary axis, of a shaft revolubly mounted in said head with its axis of rotation eccentric to the axis of rotation of said head whereby said shaft will be moved in an orbital path upon rotation of said head, means for driving said shaft to revolve it on its own axis while it is moved in an orbital path by said head, a gear rigidly secured to said head, a pinion meshing with and driving said gear, and mechanism driven from said shaft driving means for driving said pinion and thereby revolving said head to move said shaft in an orbital path with a predetermined precession ratio of the rotation of said eccentric shaft and head, said mechanism including a variable speed drive driven from said shaft driving means and connected to and driving said pinion and adapted to vary the speed at which said pinion drives said head to thereby vary the precession ratio of the rotation of said eccentric shaft relative to the rotation of said head.

3. In a mixer, the combination with a head revolubly mounted for rotation about a stationary axis, of a vertical shaft revolubly mounted in said head with its axis eccentric to the axis of rotation of the head, means for driving the vertical eccentric shaft to revolve said shaft on its own axis while it is carried in an orbital path by the rotation of said head, a plurality of clutch elements, mechanism for driving said clutch elements at relatively different speeds, driving means connected to said head and including a complementary clutch element selectively movable into operative relation with either one of said plurality of clutch elements whereby said head may be revolved at either of a plurality of different speeds while the vertical eccentric shaft revolves at approximately the same speed and thereby establish a plurality of different precession ratios of the rotation of the vertical eccentric shaft relative to the rotation of the head.

4. In a mixer, the combination with a head revolubly mounted for rotation about a stationary axis, of a vertical shaft revolubly mounted in said head with its axis eccentric to the axis of rotation of said head, means for driving said vertical eccentric shaft at a plurality of different speeds to revolve it on its own axis while it is carried in an orbital path by the rotation of the head, a gear fastened on said head, a jack shaft mounted for rotation on a stationary axis, a gear mounted on said jack shaft and meshing with and driving the gear on said head to revolve the head and thereby move the vertical eccentric shaft in an orbital path, and mechanism for driving said jack shaft, said mechanism being driven from the means for driving the vertical eccentric shaft and including a device for varying the speed at which the jack shaft is driven and thereby varying the speed at which said head is driven while the speed of the vertical eccentric shaft remains approximately the same, to vary the precession ratio of the rotation of the vertical eccentric shaft on its own axis relative to the rotation of the head.

5. In a mixer, the combination with a head revolubly mounted for rotation about a stationary axis, of a vertical shaft revolubly mounted in said head with its axis eccentric to the axis of rotation of the head, means for driving said vertical eccentric shaft at a plurality of different speeds to revolve it on its own axis while it is carried in an orbital path by the rotation of the head, a jack shaft, means driven from said jack shaft for driving said head to revolve the head on its axis of rotation, and a device for driving said jack shaft, said device including a pair of rotably mounted co-axial driving clutch elements, driving mechanism for driving said elements at different speeds, and a complementary driven clutch element having driving engagement with said jack shaft, and selectively movable into driven engagement with, either of said driving clutch elements.

6. In a mixer, the combination with a beater head revolubly mounted for rotation about a stationary axis, of a vertical shaft revolubly mounted in said head with its axis eccentric to the axis of rotation of the head, means for driving said vertical eccentric shaft at a plurality of different speeds to revolve it on its own axis while it is carried in an orbital path by the rotation of the head, a jack shaft, means driven from said jack shaft for driving said head to revolve the head on its axis of rotation, and a device for driving said jack shaft, said device including a pair of rotatably mounted co-axial driving clutch elements, driving mechanism for driving said elements at different speeds, and a complementary driven clutch element having driving engagement with said jack shaft, and selectively movable into driven engagement with either of said driving clutch elements, all of said clutch elements being supported on said jack shaft for rotation on the same axis.

7. A mixer comprising a support revoluble about a vertical axis, a vertical shaft revolubly mounted in said support with its axis eccentric to the axis of rotation of said support, a variable speed drive connected to said shaft for driving the same at various speeds, and a speed changing device driven from said variable speed drive and connected to and driving said support to cause said support to revolve and carry said shaft in an orbital path, said speed changing device including instrumentalities for increasing or decreasing the rotational speed of said support by small increments within a predetermined range to vary the speed of rotation of said support relative to the speed of rotation of said shaft and thereby vary the precession ratio of the rotation of said shaft upon its own axis relative to the rotation of said support upon said vertical axis.

LOUIS F. THIEL.

REFERENCES CITED

The following references are of record in the file of this patent:

UNITED STATES PATENTS

| Number | Name | Date |
|---|---|---|
| 1,167,336 | Clark | Jan. 4, 1916 |
| 1,264,128 | Rataiczak | Apr. 23, 1918 |
| 1,785,562 | Schiff | Dec. 16, 1930 |
| 1,859,690 | Aeschbach | May 24, 1932 |
| 2,341,756 | Avila | Feb. 15, 1944 |